(12) United States Patent
Johnson et al.

(10) Patent No.: US 7,959,110 B2
(45) Date of Patent: Jun. 14, 2011

(54) METHODS AND APPARATUS FOR RESISTING TORSIONAL LOADS IN AERIAL REFUELING BOOMS

(75) Inventors: Joel J. Johnson, Wichita, KS (US); Albert S. Pruitt, Derby, KS (US); Harry S. Slusher, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 641 days.

(21) Appl. No.: 12/058,275

(22) Filed: Mar. 28, 2008

(65) Prior Publication Data

US 2008/0251643 A1     Oct. 16, 2008

Related U.S. Application Data

(60) Provisional application No. 60/923,040, filed on Apr. 11, 2007.

(51) Int. Cl.
*B64D 39/00* (2006.01)
(52) U.S. Cl. .................... 244/135 A; 244/135 R
(58) Field of Classification Search .............. 244/135 A, 244/135 R, 172.4
See application file for complete search history.

(56) References Cited

U.S. PATENT DOCUMENTS

| | | |
|---|---|---|
| 2,859,002 A | 11/1958 | Leisy |
| 3,091,419 A | 5/1963 | Mosher |
| 3,917,196 A | 11/1975 | Pond et al. |
| 4,025,193 A | 5/1977 | Pond et al. |
| 4,072,283 A | 2/1978 | Weiland |
| 4,095,761 A | 6/1978 | Anderson et al. |
| 4,129,270 A | 12/1978 | Robinson et al. |
| 4,158,885 A | 6/1979 | Neuberger |
| 4,160,534 A | 7/1979 | White |
| 4,170,773 A | 10/1979 | Fitzsimmons et al. |
| 4,231,536 A | 11/1980 | Ishimitsu et al. |
| 4,257,703 A | 3/1981 | Goodrich |
| 4,264,044 A | 4/1981 | White |
| 4,298,176 A | 11/1981 | Kendall |
| 4,510,525 A | 4/1985 | Kuperman et al. |
| 4,519,560 A | 5/1985 | Ishimitsu et al. |
| 4,586,683 A | 5/1986 | Kerker |
| 4,633,376 A | 12/1986 | Newman |
| 4,792,107 A | 12/1988 | Fernz et al. |
| 4,834,531 A | 5/1989 | Ward |
| 5,249,128 A | 9/1993 | Markandey et al. |
| 5,267,328 A | 11/1993 | Gouge |
| 5,479,526 A | 12/1995 | Benton et al. |
| 5,499,784 A | 3/1996 | Crabere et al. |

(Continued)

FOREIGN PATENT DOCUMENTS

EP      1055939      11/2000

(Continued)

*Primary Examiner* — Christopher P Ellis
(74) *Attorney, Agent, or Firm* — Harness, Dickey & Pierce, P.L.C.

(57) ABSTRACT

A refueling boom for an aerial tanker includes an outer member operatively connected to the tanker, an inner member operatively and telescopically configured with the outer member, and one or more torque rollers. The torque roller is disposed on the outer member such that the torque roller engages with the inner member when the inner member is telescoping and reacts to torsional loads subject on the inner member when the boom is deployed in an aerial refueling operation. The inner member may include a plurality of longitudinally disposed torsion surfaces or races for respectively engaging with the torque rollers.

26 Claims, 8 Drawing Sheets

U.S. PATENT DOCUMENTS

| | | | |
|---|---|---|---|
| 5,568,136 A | 10/1996 | Hochstein et al. | |
| 5,638,461 A | 6/1997 | Fridge | |
| 5,650,828 A | 7/1997 | Lee et al. | |
| 5,785,276 A | 7/1998 | Ruzicka | |
| 5,809,161 A | 9/1998 | Auty et al. | |
| 5,809,658 A | 9/1998 | Jackson et al. | |
| 5,906,336 A | 5/1999 | Eckstein | |
| 5,978,143 A | 11/1999 | Spruck et al. | |
| 5,996,939 A | 12/1999 | Higgs et al. | |
| 6,191,809 B1 | 2/2001 | Hori et al. | |
| 6,282,301 B1 | 8/2001 | Haskett | |
| 6,477,260 B1 | 11/2002 | Shimomura et al. | |
| 6,594,583 B2 | 7/2003 | Ogura et al. | |
| 6,651,933 B1 | 11/2003 | von Thal et al. | |
| 6,752,357 B2 | 6/2004 | von Thal et al. | |
| 6,768,509 B1 | 7/2004 | Bradski et al. | |
| 6,778,216 B1 | 8/2004 | Lin et al. | |
| 6,779,758 B2 | 8/2004 | Vu et al. | |
| 6,837,462 B2 | 1/2005 | von Thal et al. | |
| 7,171,028 B2 | 1/2007 | von Thal et al. | |
| 7,209,161 B2 | 4/2007 | von Thal et al. | |
| 2003/0218097 A1* | 11/2003 | Vu et al. | 244/135 A |
| 2006/0043241 A1* | 3/2006 | Schuster et al. | 244/135 A |
| 2006/0060710 A1* | 3/2006 | Takacs et al. | 244/135 A |
| 2006/0108475 A1* | 5/2006 | Bartov | 244/135 A |
| 2007/0084968 A1* | 4/2007 | Thal et al. | 244/135 A |
| 2007/0262203 A1* | 11/2007 | Saggio et al. | 244/135 A |
| 2008/0061190 A1* | 3/2008 | Queveau et al. | 244/135 A |
| 2008/0093505 A1* | 4/2008 | Ortega De Miguel et al. | 244/135 A |
| 2010/0001124 A1* | 1/2010 | Feldmann | 244/58 |

FOREIGN PATENT DOCUMENTS

| | | |
|---|---|---|
| GB | 2233527 | 1/1991 |
| GB | 2300082 | 10/1996 |
| RU | 2099253 | 12/1997 |

* cited by examiner

METHODS AND APPARATUS FOR RESISTING TORSIONAL LOADS IN AERIAL REFUELING BOOMS

CROSS REFERENCE TO RELATED APPLICATIONS

The present application claims priority under 35 U.S.C. 119(e) on U.S. Provisional Application for Patent Ser. No. 60/923,040 filed Apr. 11, 2007, the entire disclosure of which is incorporated herein by reference The disclosure relates in general to subject matter disclosed in U.S. Pat. Nos. 3,976,100; 4,072,283; 4,095,761; 4,586,683; 4,633,376; 5,785,276; 5,904,729; 5,996,939; and 7,147,186; and U.S. Patent Application Publication Nos. 2006/0278760, 2006/0278761, 2006/0278763, and 2007/0051406, the disclosure of each of these patents and applications being incorporated herein by reference.

BACKGROUND

The disclosure relates in general to refueling aircraft and more specifically to methods and apparatus for resisting torsional loads in aerial refueling booms.

Aircraft in flight are commonly refueled from a refueling aircraft. The refueling aircraft is typically provided with a telescopic boom mechanism or a flexible hose which trails behind the refueling aircraft and physically makes a connection to the aircraft to be refueled (i.e., the receiver aircraft).

Refueling aircraft have a plurality of wing fuel tanks and a central wing tank. Auxiliary fuel tanks can also be provided within or proximate to a fuselage of the aircraft. Fuel is commonly transferred to the boom or hose via a single wall header which is isolable by one or more shut-off valves. Common refueling systems include pumps to pressurize the fuel for transfer from one or more of the tanks, and valves which are controlled between an open and closed condition by simple on-off switches normally positioned on a refueling system panel and manually selected by a trained refueling operator.

During an aerial refueling operation utilizing a refueling tanker with a telescopic boom, torsional loads are introduced to the boom by the actions of the receiver aircraft and the aerodynamic loading on the boom. To better understand this phenomenon, it is beneficial to discuss the disadvantages of conventional refueling boom designs. In this regard, reference is made to FIG. 1 in which is shown in cross section a conventional boom 10 including an outer tube 12 and an inner tube 14. The outer tube 12 is a fixed portion of the boom and houses the inner tube 14 which extends in a telescopic manner for the purpose of engaging and refueling a receiver aircraft.

The conventional boom 10 also includes two pairs of rollers: an upper pair of rollers 16a and a lower pair of rollers 16b. The upper rollers 16a and the lower rollers 16b apply counter forces to both vertical and horizontal loads applied to the boom during refueling operations. The presence of vertical and horizontal loads can create torsional loads. While the inclusion of rollers 16 to counteract the vertical and horizontal loads is taken into consideration, conventional booms do not take into consideration these torsional loads. Accordingly, conventional booms may be subject to excessive wear on the rollers 16. In addition, analysis of the wear of the rollers 16 and the inner tube 14 has revealed the presence of torsional loads.

In view of the foregoing, there is a need in the art to overcome the disadvantages of conventional telescopic booms. In addition, there is a need to adequately resist or react to the torsional loads subject on refueling booms. Still further, there is a need to reduce the frequency and length of time required to maintain booms subject to torsional loads.

SUMMARY

The disclosure relates in general to refueling aircraft and more specifically to methods and apparatus for resisting torsional loads in aerial refueling booms.

According to one aspect, a refueling boom for an aerial tanker includes an outer member operatively connected to the tanker, an inner member operatively and telescopically configured with the outer member, and one or more torque rollers. The torque roller is disposed on the outer member such that the torque roller engages with the inner member when the inner member is telescoping and reacts to torsional loads subject on the inner member when the boom is deployed in an aerial refueling operation. In some of the embodiments, the inner member may include a plurality of longitudinally disposed torsion surfaces or races for respectively engaging with the torque rollers.

According to another aspect of the invention, a refueling boom includes an outer member, an inner member substantially concentrically disposed with respect to the outer member about a telescopic axis and including a plurality of races, and a plurality of rollers operatively disposed on the outer member substantially circumferentially about the inner member such that the rollers are respectively engageable with races of the inner member when the inner member moves relative to the outer member along the telescopic axis. The races are disposed on the inner member such that a number of the rollers bear the torsional load when the torsional load is bearing in a substantially clockwise direction about the telescopic axis, and a number of the rollers bear the torsional load when the torsional load is bearing in a substantially counterclockwise direction about the telescopic axis.

One of the advantages of the refueling boom is that wear on the rollers is minimized, thereby maximizing the maintenance interval on the boom. Accordingly, maintenance costs and down time are reduced.

Other aspects of the invention include refueling tankers including a boom configured to react to torsional loads, methods of refueling a receiver aircraft with an aerial refueling tanker, and method for operating a refueling tanker.

Other aspects, features, and advantages of the present invention will become apparent to those skilled in the art from a consideration of the following detailed description taken in conjunction with the accompanying drawings.

DETAILED DESCRIPTION

Figure 1:
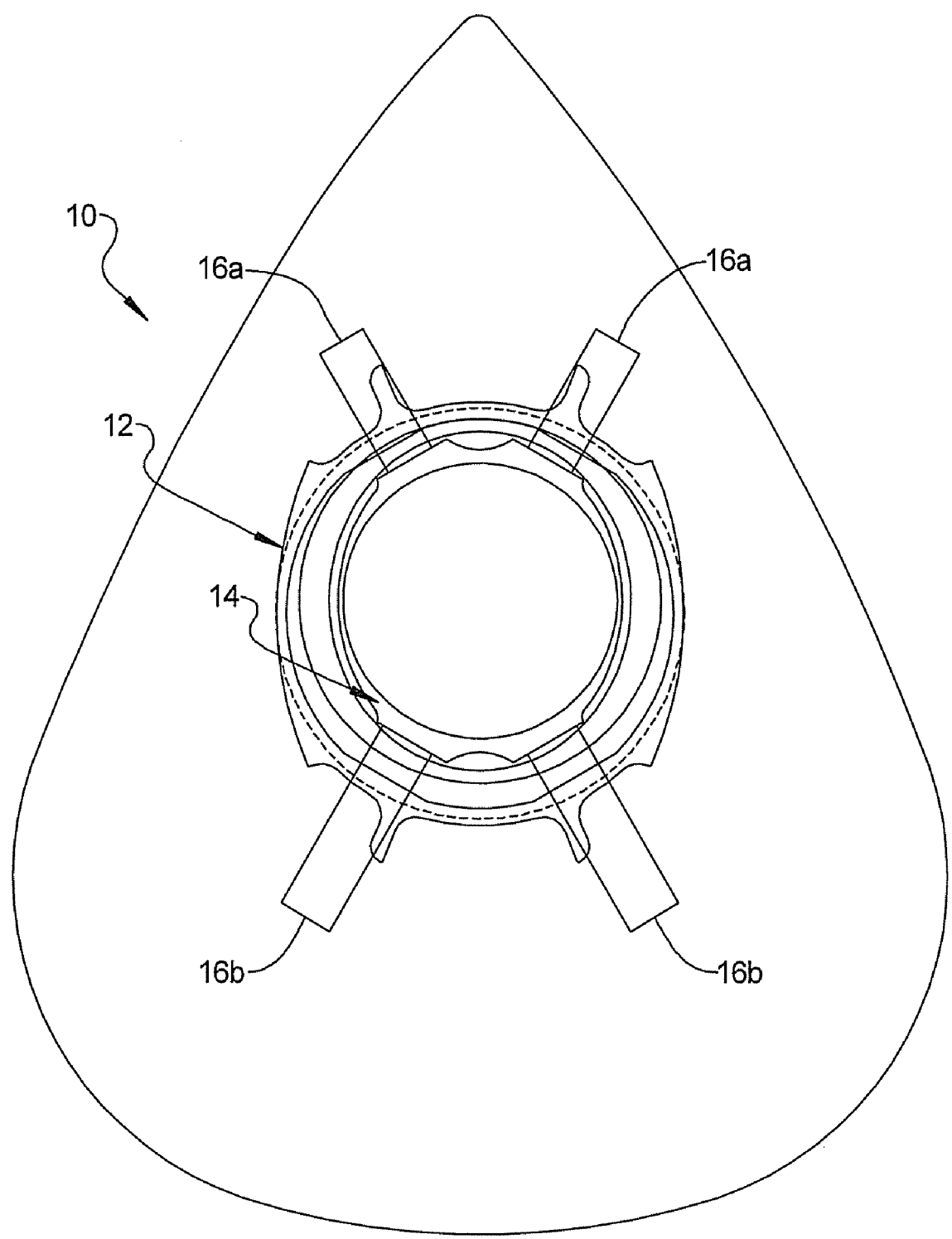
FIG. 1 illustrates a telescopic refueling boom according to the prior art.
Figure 2:
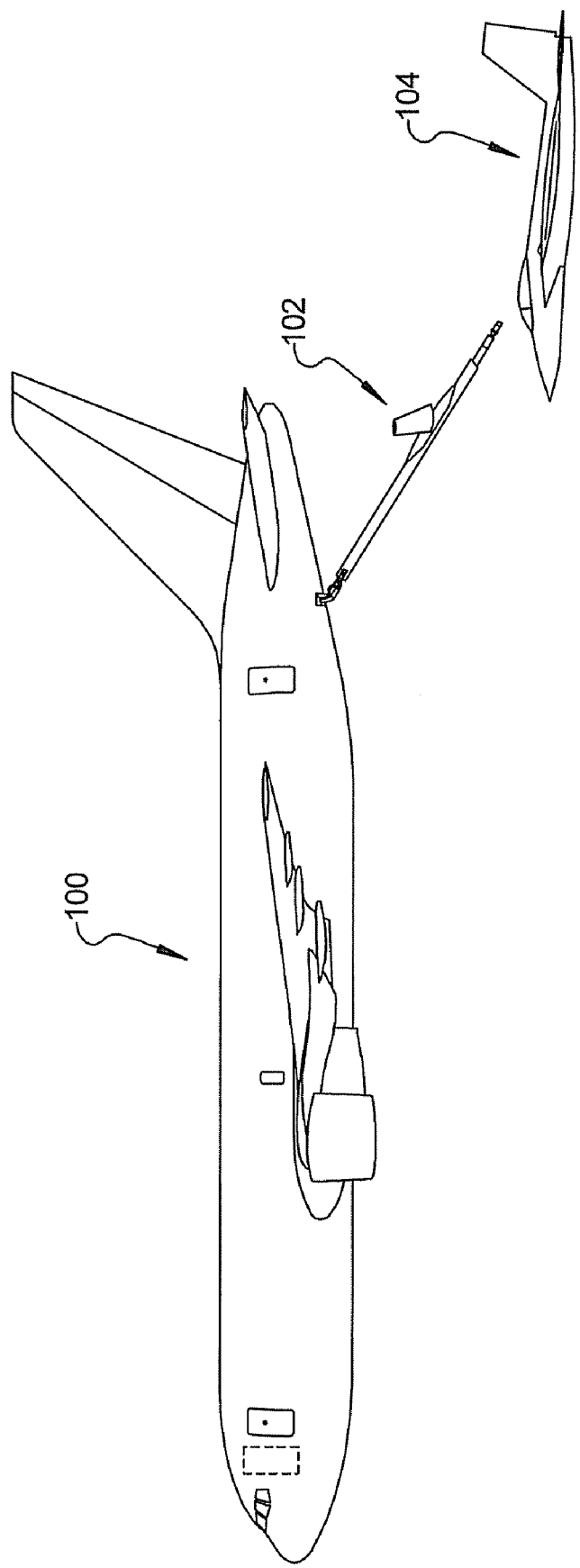
FIG. 2 illustrates an aerial refueling operation according to a number of embodiments.
Figure 3:
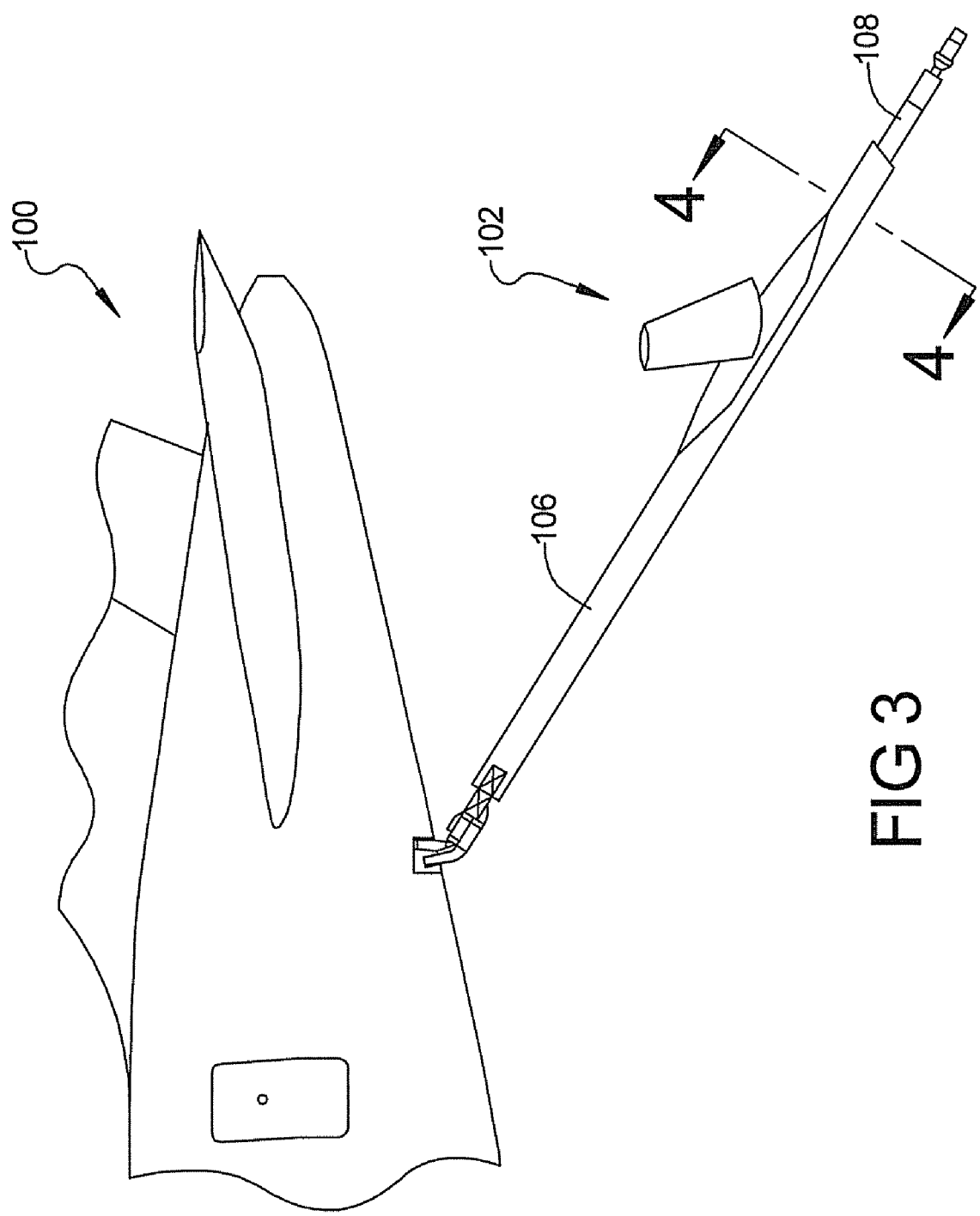
FIG. 3 is a fragmentary elevation view illustrating a telescopic refueling boom according to many of the embodiments.

Referring more particularly to the drawings, an aerial refueling tanker 100 including a telescopic boom 102 that is configured to resist or react to torsional forces subject thereon is shown in FIG. 2 during an aerial refueling operation with a receiver aircraft 104. With additional reference to FIGS. 3 and 4, in a number of embodiments the refueling boom 102 may include an outer member 106 and an inner member 108. The outer member 106 is operatively connected to the tanker 100, and the inner member 108 is operatively and telescopically configured with respect to the outer member 106 and is configured to engage with the receiver aircraft 104. In some of the embodiments, the inner member 108 may be disposed in a substantially concentric manner with the outer member 106.

Figure 4:
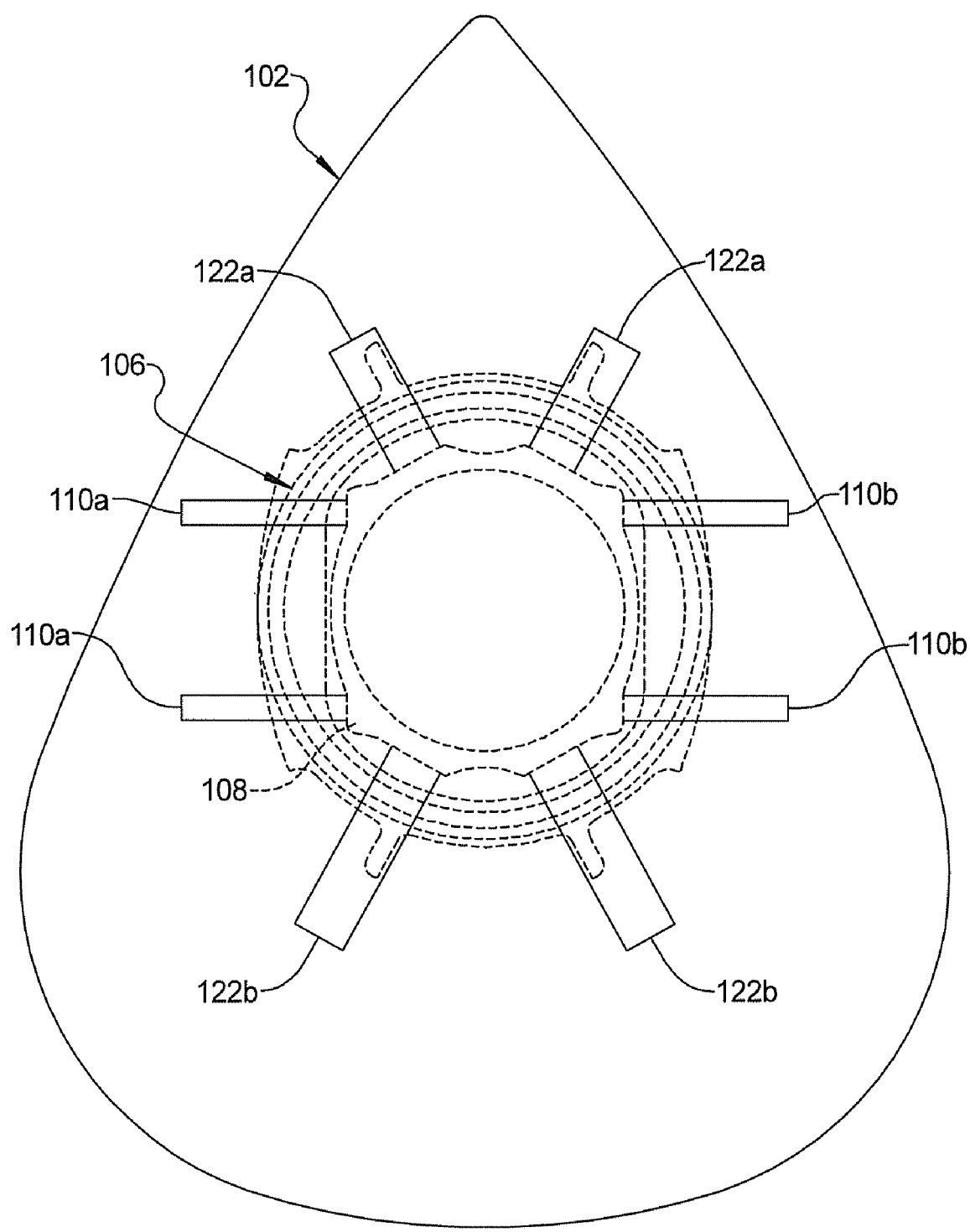
FIG. 4 illustrates schematically a telescopic refueling boom according to a number of embodiments.

According to many of the embodiments such as shown in FIG. 4, the boom 102 may also include one or more torque rollers 110 operatively disposed on the outer member 106 such that the torque rollers 110 engage with the inner member 108 when the inner member 108 is telescoping, and react to torsional loads subject on the inner member 108 when the boom 102 is deployed during an aerial refueling operation. Contributing factors to the torsional load on the inner member 108 may include load interaction between the tanker 100 and the receiver aircraft 104 and the aerodynamic load on the boom 102 itself.

Figure 5:
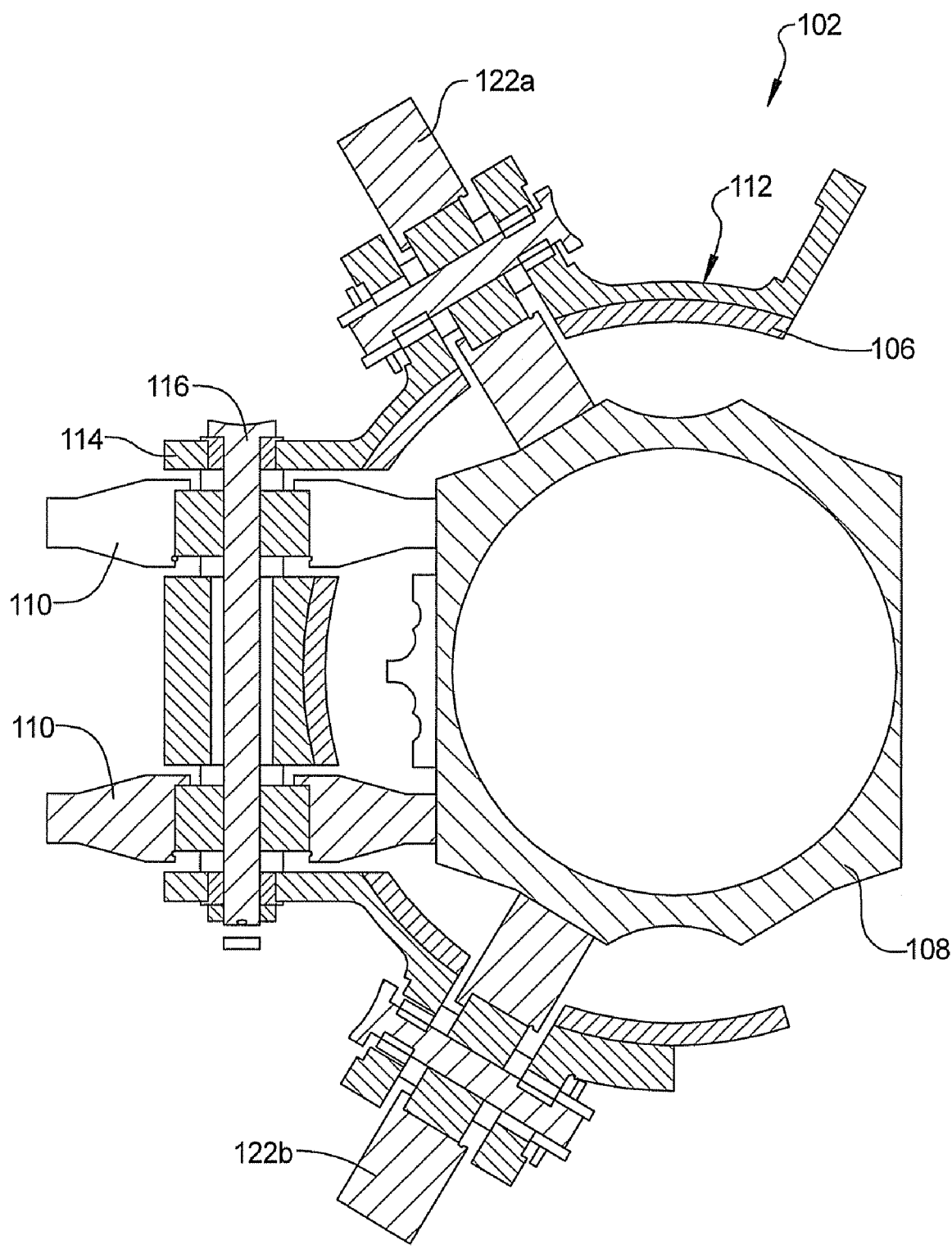
FIG. 5 illustrates in section a telescopic refueling boom according to other embodiments.
Figure 6:
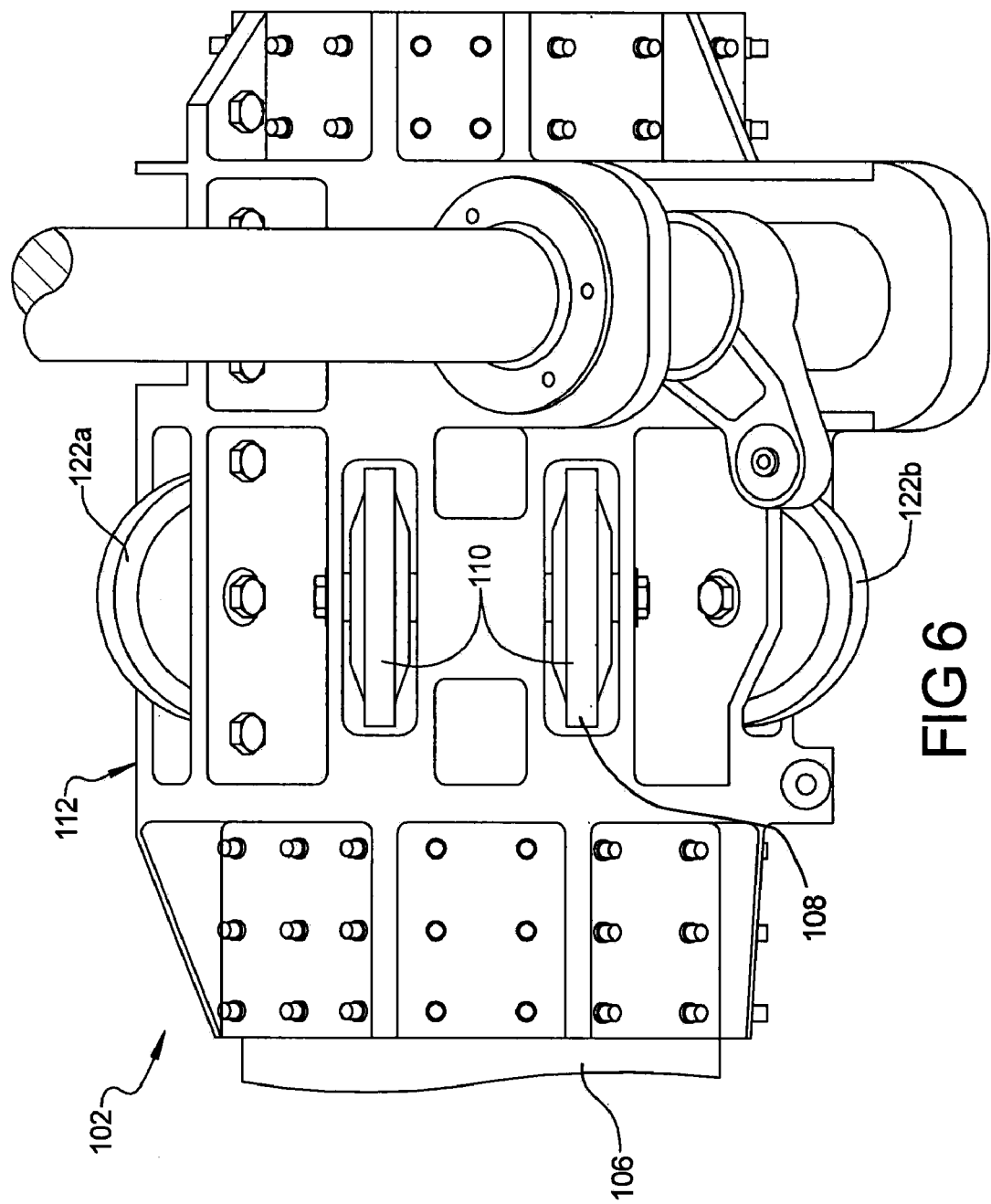
FIG. 6 illustrates in perspective a portion of a telescopic refueling boom according to still other embodiments.

With reference to FIGS. 5 and 6, in some of the embodiments the boom 102 may include a support fitting 112 on which the torque rollers 110 are rotatably mounted. The support fitting 112 may be perimetrically disposed about the outer member 106 and may include a respectively number of supports 114 and axels 116 for receiving the rollers 110.

Figure 7:
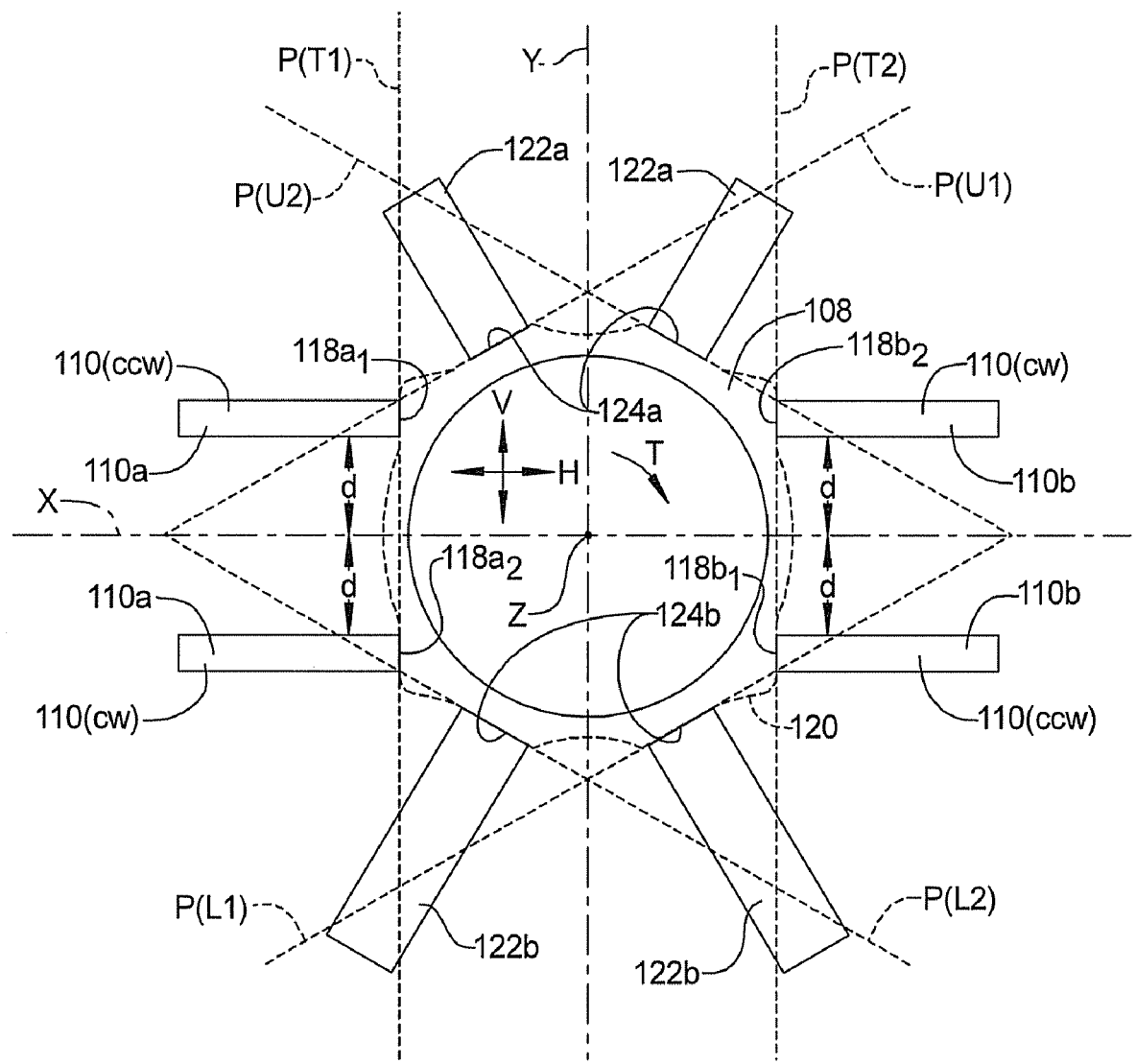
FIG. 7 schematically illustrates features of still further embodiments of a refueling boom.

Referencing the embodiments shown in FIGS. 4 and 7, the plurality of torque rollers 110 may include one or more pairs of torque rollers 110a and 110b respectively disposed about the inner member 108. For the purposes of this description and as particularly shown in FIG. 7, the inner member 108 may be described as having a telescopic axis (indicated by axis z) along which the inner member 108 moves relative to the outer member 106, a substantially transverse horizontal axis (indicated as axis x), and a substantially vertical axis (indicated as axis y). Accordingly, in a number of embodiments the respective pairs of rollers 110a and 110b may be disposed in a substantially lateral arrangement about the transverse axis x. In other embodiments, the rollers 110 of each pair of rollers may be offset from the transverse axis x by a distance d.

With reference to FIGS. 5 and 7, in many of the embodiments the inner member 108 may include a plurality of longitudinally disposed (i.e., along the telescopic axis z) torsion surfaces or races 118 disposed on an outer surface 120 thereof. For the purposes of this description, the term "race" is used to describe any type of channel, groove, surface, slot, or structure that is configured to enable sliding or rolling a part or parts, such as the rollers 110 shown in the figures.

In the particular embodiment shown in FIG. 5, the plurality of races 118 may include a first pair of races 118a and a second pair of races 118b for respectively engaging the first and second pairs of rollers 110a and 110b. In some of the embodiments, the pairs of races 118a and 118b may be respectively disposed in a substantially coplanar manner for engaging the first and second pairs of torque rollers 110a and 110b. More specifically, in many of the embodiments, the inner member 108 may be described as having a first torque plane P(T1) and a second torque plane P(T2) respectively defined through the first and second pairs of races 118a and 118b. In some of the embodiments, the inner member 108 may be configured such that the torque planes P(T1) and P(T2) are substantially parallel with each other.

With reference to FIGS. 4-7, in a number of embodiments, the plurality of rollers may also include a plurality of load rollers 122 disposed on the outer member 106 such that the load rollers 122 engage with the inner tube 108 when the inner tube is telescoping and react to side loads (e.g., vertical loads and horizontal loads) that may be subject on the inner member 108 when the boom 102 is deployed during an aerial refueling operation.

In many of the embodiments, the plurality of load rollers 122 may include one or more upper rollers 122a and one or more lower rollers 122b disposed on the outer member 106. In still other embodiments, the upper rollers 122a may be configured as a pair of rollers disposed about the vertical axis y, and the lower rollers 122b may be configured as a pair of rollers disposed about the vertical axis y. In load-roller embodiments, the inner member 108 may include a plurality of load races 124 for respectively engaging with load rollers 122. For example, the load races 124 may include a pair of load races 124a for engaging the upper rollers 122a and a pair of load races 124b for engaging the lower rollers 122b.

With reference to FIG. 7, a number of embodiments of the boom 102 may be described as including a plurality of rollers 110 and 122 operatively disposed on the outer member 106 in a substantially circumferential manner about the inner member 108 such that the rollers 110 and 122 are respectively engageable with the races 118 and 124 when the inner member 108 moves relative to the outer member 106 along the telescopic axis z. As mentioned above and as indicated in FIG. 7, the inner member 108 may be subject to torsional loads T, such as in a clockwise (CW) direction or a counter-clockwise (CCW) direction about the telescopic axis z.

In this regard, in some of the embodiments the torque races 118 may be disposed or configured on the inner member 108 such that a number of the torque rollers 110(CW) bear, resist, or react the torsional load T when the torsional load T is bearing in a substantially clockwise direction about the telescopic axis z, and a number of the torque rollers 110(CCW) bear, resist, or react to the torsional load T when the torsional load is bearing in a substantially counter-clockwise direction about the telescopic axis. In other embodiments the torque races 118 may be disposed or configured on the inner member 108 such that a number of the races 118a1 and 118b1 respectively engage with the rollers 110(CCW) to substantially prevent or hinder rotation of the inner member 108 when a torsional load T urges the inner member 108 in a counter-clockwise direction about the telescopic axis z, and a number of the races 118a2 and 118b2 respectively engage with the rollers 110(CW) to substantially prevent or hinder rotation of the inner member 108 when a torsional load T urges the inner member 108 in a clockwise direction about the telescopic axis z.

Figure 8:
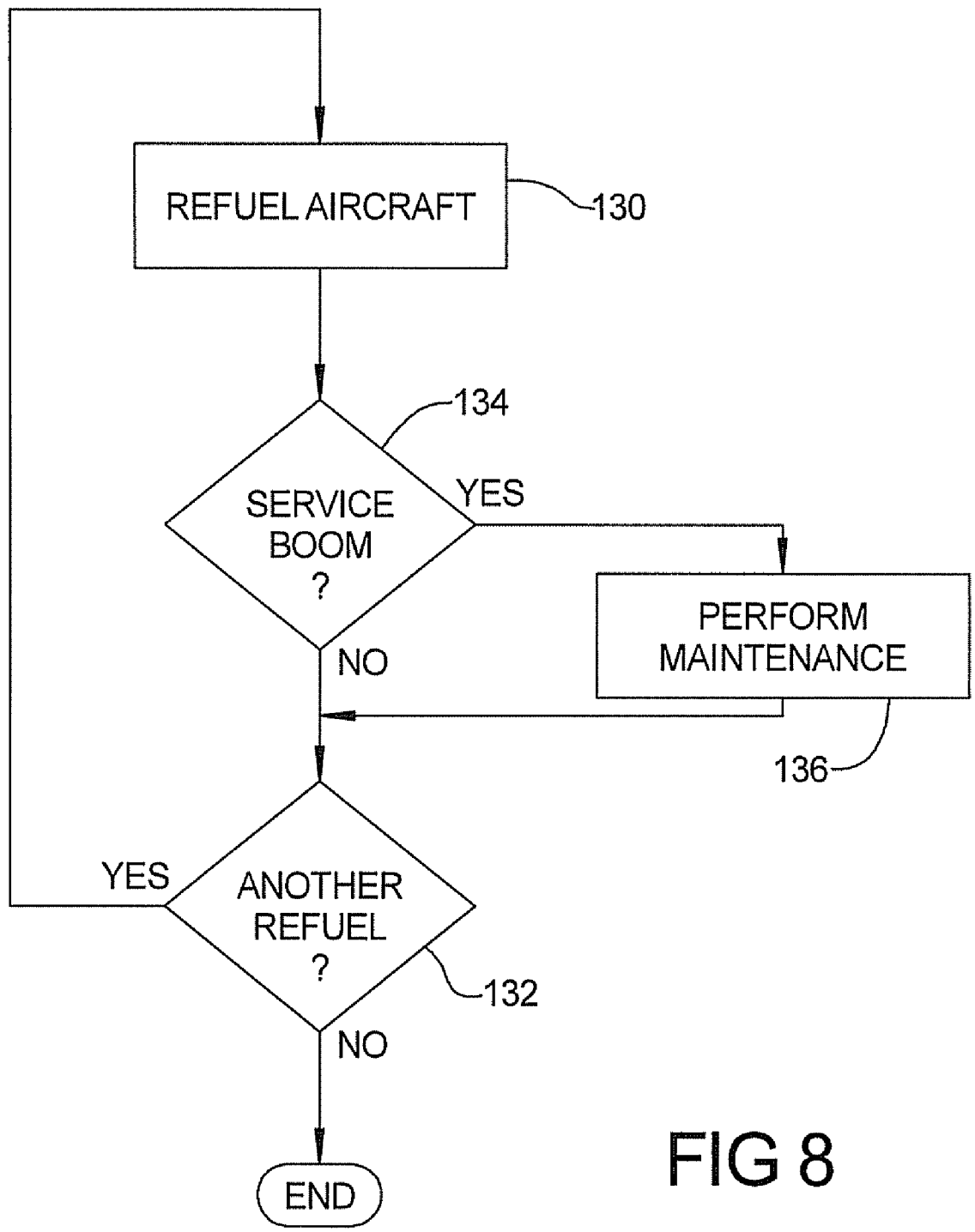
FIG. 8 illustrates methodology for operation a refueling tanker according to a number of embodiments.

In view of the foregoing description of embodiments of the boom 102, a number of associated methods in which the boom 102 may be utilized will now be described. With reference to FIGS. 2 and 8, an aerial refueling operation 130 includes deploying the tanker 100 and deploying the boom 102 when a receiver aircraft 104 is ready to receive fuel, thereby subjecting the inner member 108 to potential torsional loads. During deployment of the boom 102, the inner member 108 is telescopically extended from the outer member 106.

According to the embodiments described above, the inner member 108 is configured to react to any torsional load subject on the inner member 108 when extended from the outer member 106. For example, to react to the torsional load, the inner member 108 may be configured to substantially prevent rotation of the inner member 108 about a telescopic axis along which the inner member 108 is extensible. As described above, the inner member 108 may be configured to substantially prevent clockwise rotation of the inner member 108 at a plurality of locations (e.g., at races 118a2 and 118b2) on the inner member 108 and substantially preventing counterclockwise rotation of the inner member 108 at a plurality of locations (e.g., at races 118a1 and 118a2) on the inner member 108. When the boom 102 is deployed and engaged with the receiver aircraft 104, then fuel may be transferred to the receiver aircraft 104.

The refueling operation 130 may be repeated a plurality of times 132. As discussed above, the side loads and the torsional loads may cause wear on the rollers 110 and 122, as well as on the inner member 108. Accordingly, an operator of the tanker 100 may periodically service 134 the boom. While performing maintenance 136 on the boom 102, the rollers 110 and 118 may be service or replaced. As mentioned above, one of the advantages of the boom 102 described herein over conventional booms is that the time between or frequency of scheduled maintenance 134 and 136 may be significantly reduced with the inclusion of the torque rollers 110. In other words, the torque rollers 110 minimize wear to the boom 102, thereby maximizing the maintenance interval 134.

Referring again to FIGS. 5 and 6, additional embodiments of apparatus 112 for addressing torsional loads in a refueling boom 102 will now be described. The support fitting 112, which is shown as upper and lower support fittings, is located outside of the outer tube 106 and at one end of the outer tube 106 to allow the inner tube 108 to pass through and extend out. In addition, a portion of the support fitting 112 is attached to the outer tube 106, but the rest extends beyond the end of the outer tube to provide support to the inner tube via rollers 110. As mentioned previously, during a refueling process, the boom 102 is exposed to different types of loads and as a result it may bend or break. So, the support fitting 112 provides different types of counter forces to the boom 102 to prevent the boom 102 from bending.

The support from the support fitting 112 is applied through rollers 110 because applying a force to the inner tube 108 through a fixed object can possibly damage the tube 108, or the tube 108 can possibly break the fixed object. However, rollers 110 can exert force onto the tube 108 and roll on the surface of the inner tube 108 as the tube extends out or extracts in.

Referring to FIG. 5, the boom 102 is shown to include additional side rollers 110a and 110b to apply counter forces to the inner tube 108. Rollers 110a are placed on one side of the inner tube 108 and rollers 110b are placed on the opposite side. It should be noted that the rollers 110 do not have to touch the inner tube 108, but during a refueling operation, when the external loads move the inner tube 108, the rollers 110 may come in contact with the inner tube 108 to provide support.

As shown in FIG. 4, if the torsional load is counter-clockwise, it might slightly deform the inner tube 108 whereby the top roller of rollers 110a and the lower roller of roller 110b come in contact with and support the inner tube 108. However, if the torsional load is clockwise, then the inner tube 108 moves and the top roller of rollers 110b with the lower roller of rollers 110a support the inner tube 108.

It should be noted that in exchange for a less support, one might use just one roller 110 on each side. The roller design shown in these embodiments is intended to provide sufficient resistance to the torsional loads. Rollers 110 are placed along either side of the telescoping boom in an orientation to maximize the ability to resist the torsional loads.

Those skilled in the art will understand that the preceding embodiments of the present invention provide the foundation for numerous alternatives and modifications thereto. These other modifications are also within the scope of the present invention. Accordingly, the present invention is not limited to that precisely as shown and described in the present invention.

What is claimed is:

1. A torsional load resisting aerial refueling boom comprising:
   a telescopic boom having a fixed portion and an extendable portion;
   a support fitting attached to one end of the fixed portion for allowing the extendable portion to pass therethrough; and
   a plurality of rollers mounted on the support fitting for rolling with respect to the movement of the extendable portion of the boom and for providing a counter force to the boom in response to a torsional load subject on the boom during aerial refueling.

2. The refueling boom of claim 1, wherein the plurality of the rollers includes two sets of rollers disposed on generally opposing sides of the boom to provide opposing forces.

3. The refueling boom of claim 2, wherein each set has two rollers and the first roller from the first set and the second roller from the second set provide the counter force to the torsional load and if the torsional load is in the opposite direction, the second roller from the first set and the first roller from the second set provide the counter force to the torsional load.

4. A refueling boom for an aerial tanker, the boom comprising:
   an outer member operatively connected to the tanker;
   an inner member operatively and telescopically configured with the outer member; and
   a torque roller disposed on the outer member such that the torque roller:
   engages with the inner member when the inner member is telescoping; and
   reacts to torsional loads subject on the inner member when the boom is deployed in an aerial refueling operation.

5. The boom of claim 4 further comprising a plurality of the torque rollers.

6. The boom of claim 5 wherein the plurality of torque rollers includes pairs of torque rollers respectively disposed on the outer member.

7. The boom of claim 5 wherein the torque rollers are disposed on the outer member in a substantially lateral arrangement.

8. The boom of claim 4 further comprising a plurality of the torque rollers including a first pair of torque rollers and a second pair of torque rollers; and
wherein:
   the inner member includes a plurality of longitudinally disposed torsion surfaces including a first pair disposed in a substantially coplanar manner for engaging the first pair of torque rollers and a second pair disposed in a substantially coplanar manner for engaging the second pair of torque rollers.

9. The boom of claim 8 wherein a first plane and a second plane are respectively defined through the first and second pairs of surfaces such that the planes are substantially parallel with each other.

10. The boom of claim 9 wherein the inner member is defined as having a transverse axis, the rollers of each of the pairs of rollers being offset from the transverse axis.

11. The boom of claim 4 further comprising an upper roller and a lower roller disposed on the outer member in a substantially vertical arrangement such that the upper and lower rollers:
engage with the inner tube when the inner tube is telescoping; and
react to side loads subject on the inner member when the boom is deployed in an aerial refueling operation.

12. The boom of claim 4 further comprising a plurality of load rollers disposed on the outer member such that the load rollers:
engage with the inner member when the inner member is telescoping; and
react to any horizontal and vertical loads subject on the inner member when the boom is deployed in an aerial refueling operation.

13. An aerial refueling tanker including the boom of claim 4.

14. A refueling boom comprising:
an outer member;
an inner member substantially concentrically disposed with respect to the outer member about a telescopic axis and including a plurality of races, the inner member being subjectable to a torsional load about the telescopic axis;
a plurality of rollers operatively disposed on the outer member substantially circumferentially about the inner member such that the rollers are respectively engageable with races of the inner member when the inner member moves relative to the outer member along the telescopic axis;
the races being disposed on the inner member such that:
a number of the rollers bear the torsional load when the torsional load is bearing in a substantially clockwise direction about the telescopic axis; and
a number of the rollers bear the torsional load when the torsional load is bearing in a substantially counter-clockwise direction about the telescopic axis.

15. The boom of claim 14 wherein the races are disposed on the inner member such that:
a number of the races respectively engage with the rollers to substantially prevent rotation of the inner member when a torsional load urges the inner member in a clockwise direction about the telescopic axis; and
a number of the races respectively engage with the rollers to substantially prevent rotation of the inner member when a torsional load urges the inner member in a counterclockwise direction about the telescopic axis.

16. A method of refueling a receiver aircraft with an aerial refueling tanker including a telescopic boom having an outer member and an inner member, the latter of which being subjectable to torsional loads during an aerial refueling operation, the method comprising:
telescopically extending the inner member from the outer member when the boom is deployed; and
operatively deploying a plurality of rollers on the outer member that will react to any torsional load subject on the inner member when extended from the outer member.

17. The method of claim 16 wherein the reacting step further comprises substantially preventing rotation of the inner member about a telescopic axis along which the inner member is extensible.

18. The method of claim 17 wherein the reacting step further comprises substantially preventing clockwise rotation of the inner member at at least two locations on the inner member and substantially preventing counter-clockwise rotation of the inner member at at least two locations on the inner member.

19. The method of claim 16 further comprising transferring fuel to the receiver aircraft when the boom is engaged therewith.

20. The method of claim 19 further comprising:
deploying the boom including the extending and reacting steps; and
repeating the deploying and transferring steps a plurality of times.

21. A method of performing an aerial refueling operation, the method comprising:
providing an aerial refueling tanker including the refueling boom of claim 1; and
deploying the boom when the tanker is in flight.

22. The method of claim 21 further comprising:
engaging a receiver aircraft when the boom is deployed; and
transferring fuel from the tanker to the receiver aircraft.

23. The method of claim 22 further comprising:
repeating the deploying, engaging and transferring steps a plurality of times.

24. A method of operating an aerial refueling tanker including the refueling boom of claim 11, the method comprising deploying the tanker to refuel a receiver aircraft.

25. The method of claim 24 further comprising repeating the deploying step a plurality of times.

26. The method of claim 25 further comprising performing a maintenance operation on the refueling boom.

* * * * *

UNITED STATES PATENT AND TRADEMARK OFFICE
CERTIFICATE OF CORRECTION

| | | |
|---|---|---|
| PATENT NO. | : 7,959,110 B2 | Page 1 of 1 |
| APPLICATION NO. | : 12/058275 | |
| DATED | : June 14, 2011 | |
| INVENTOR(S) | : Johnston et al. | |

It is certified that error appears in the above-identified patent and that said Letters Patent is hereby corrected as shown below:

On title page, Item (12) and (75) Inventors, 1st inventor (Joel J.) "Johnson" should be --Johnston--

Signed and Sealed this
Thirteenth Day of September, 2011

David J. Kappos
*Director of the United States Patent and Trademark Office*